United States Patent
Sharp, III

(10) Patent No.: US 6,318,745 B1
(45) Date of Patent: Nov. 20, 2001

(54) LEANING COORDINATED SELF-STABILIZING BICYCLE TRAINING WHEELS

(76) Inventor: James Virgil Sharp, III, 1008 Robinfield Dr., Raleigh, NC (US) 27603

(*) Notice: Subject to any disclaimer, the term of this patent is extended or adjusted under 35 U.S.C. 154(b) by 0 days.

(21) Appl. No.: 09/676,206

(22) Filed: Sep. 29, 2000

(51) Int. Cl.$^7$ .................................................. B62H 1/12
(52) U.S. Cl. ........................ 280/303; 280/293; 280/301
(58) Field of Search .................................... 280/293, 300, 280/301, 302, 303, 298

(56) References Cited

U.S. PATENT DOCUMENTS

| Re. 18,424 | * | 4/1932 | Hess . |
| 720,860 | | 2/1903 | Von Trutzschler . |
| 1,077,210 | * | 10/1913 | Alesani . |
| 1,921,029 | * | 8/1933 | Hess . |
| 2,391,982 | * | 1/1946 | Kutil . |
| 2,450,979 | | 10/1948 | Moller . |
| 2,793,877 | | 5/1957 | Meier, Jr. . |
| 4,595,213 | | 6/1986 | Tsuchie . |
| 4,810,000 | | 3/1989 | Saunders . |
| 5,064,213 | | 11/1991 | Storch . |
| 5,100,163 | | 3/1992 | Egley . |
| 5,352,403 | | 10/1994 | Egley . |

* cited by examiner

*Primary Examiner*—Anne Marie Boehler

(57) ABSTRACT

An improved adjustable training wheel apparatus for attachment to a bicycle as a stabilizing aid to developing balancing skills when first learning to ride a bicycle, and allowing the bicycle body to lean in either direction while being ridden, includes a hinged frame on each side of the rear wheel axle that is rectangular in shape while the bicycle is upright, but forms a parallelogram when the bicycle leans in either direction, each side of the frame connected to an adjacent side by a hinge, one side of each frame attached to the rear bicycle wheel, and the opposite parallel side supporting an auxiliary wheel. A chain or cable working in concert with a tension spring attached to the outside upper and inside lower frame corners to halt the bicycle lean in a turn and increase the restoring forces on the bicycle when in a turn, while the spring on the other frame maintains the auxiliary wheel in contact with the ground. The training wheel apparatus allows a restricted range of adjustably dampened axial movement thereby providing more realistic training. As the axial dampening forces are reduced they more closely approximating the actual degree of balancing necessary to ride the bicycle without the training wheel apparatus.

8 Claims, 4 Drawing Sheets

LEANING COORDINATED SELF-STABILIZING BICYCLE TRAINING WHEELS

BACKGROUND OF THE INVENTION

1. Field of the Invention

The present invention relates in general to bicycle training wheel apparatuses and pertains, more particularly, to an improved adjustable, self stabilizing training wheel apparatus to assist beginning bicycle riders to maintain their balance while learning to ride a bicycle, and stabilizing the bicycle while being restricted in a range of adjustably dampened axial movement. The apparatus preferably attaches to both sides of the rear wheel of the bicycle.

2. Prior Art

Conventional training wheel assemblies typically include a pair of auxiliary wheels positioned on opposite sides of the bicycle with arms extended sideways, and adjacent to the rear wheel such as is shown in U.S. Pat. No. 4,615,535. The auxiliary wheels act between the ground and bicycle body to resist a tipping or turning over of the bicycle upon either of its sides and to stabilize the bicycle when the bicycle is oriented upright. Hence, the bicycle equipped with such a prior art auxiliary wheel arrangement could not have its body leaned even in making a sharp turn to restore balance against the centrifugal force then acting on the bicycle body, this resulting in an increased risk of falling or making it difficult to ride.

As the rider gains skill and confidence the wheels are adjusted upward with respect to the surface of the ground. The auxiliary wheels no longer ride along the ground and the rider must improve his or her balance to ride the bicycle. Eventually the rider learns to ride the bicycle and the training wheel assembly is removed.

A limitation associated with a conventional training wheel assembly of the aforementioned type relates to the reduction of stability provided by the assembly when the front wheel of the bicycle is turned to effect a steering change, and is due, at least in part, to this rigid arrangement which does not permit the bicycle to be leaned during the course of a steering change. Hence, motion forces of the bicycle which tend to urge the bicycle along a straight-ahead course and which are normally compensated for by leaning the bicycle into a turn, are instead likely to tip the bicycle over in the opposite direction of an attempted turn, possibly resulting in injury to the rider.

Such compensations are not necessary adjustments when riding a bicycle without a training wheels apparatus, and therefore the bicycle rider is not exposed to the normal leaning action of a bicycle without training wheel assemblies. An inexperienced rider may be unprepared for the normal leaning action when making the transition from a bicycle with a training wheel assembly to a bicycle without a training wheel arrangement.

Improvements to the fixed training wheel assembly such as those in U.S. Pat. Nos. 4,595,213; 5,064,213; 5,100,163; 5,352,403 typically involve combinations of articulated arms, springs, and other components which can accommodate changes in the tilting positions of the bicycle. Adjustable training wheel assemblies of this type typically include an auxiliary wheel arrangement which comprises arms extending sideways from the bicycle body to be vertically displaceable, a means for imparting to the arms a torque required for lowering the tips of these arms, and auxiliary wheels attached to the tips of the arms.

A limitation associated with an adjustable training wheel assembly of the aforementioned type relates to the sideways skidding of the auxiliary wheels during bicycling when the bicycle is leaned in either direction. The auxiliary wheels are displaced vertically during turning, which also has the unwanted effect of displacing the auxiliary wheels horizontally, thus changing the respective distances between the rear bicycle wheel and the auxiliary wheels at the point of ground contact, increasing or decreasing the separation between the rear bicycle wheel and the auxiliary wheels depending on the direction of bicycle lean. This construction has the unwanted result of slowing the bicycle due to frictional forces created during turning maneuvers, increased turning vibration from alternate gripping or sliding of the auxiliary wheels, and premature wear of the auxiliary wheels.

U.S. Pat. No. 4,595,213 attempts to limit the premature wear of the auxiliary wheels by utilizing tires with a "high friction coefficient". A limitation of this arrangement is it further increases both vibration and frictional forces while turning the bicycle, thus slowing the bicycle further.

SUMMARY OF THE INVENTION

Accordingly, it is an object of the present invention to provide an improved self compensating adjustable training apparatus easily attachable to a bicycle for the purpose of facilitating the learning to ride by stabilizing the bicycle while being ridden straight-ahead or while being turned.

Another object of the invention is to provide an attachment of the character set forth for bicycles which is constructed and arranged to permit the vehicle to conform to the natural tendency of the rider to lean or bank inwardly when making a turn thereon.

Another object of the present invention is to provide such an assembly which overcomes the lack of stability involved in turning a bicycle with a fixed training wheel assembly.

A still further object of this invention is to provide an adjustable training wheel assembly that will allow an inexperienced rider to adjust to the "feel" of riding a bicycle and learn to balance more naturally with a training wheel assembly that allows the bicycle to lean within certain adjustable limits.

Still another object of the present invention is to provide such an assembly which eliminates the frictional forces due to distance changes between the rear bicycle wheel and the auxiliary wheels.

Yet another object of the present invention is to provide such an assembly which effectively allows the bicycle to lean during turning thereby simulating to the rider the normal action of a bicycle without a training wheel apparatus.

Still a further object of the present invention is to provide such an assembly which allows an uncomplicated adjustment of the lean angle of the bicycle during turning.

A further object of the present invention is to provide an adjustable degree of resistance to the lean of the bicycle to enhance the stability of the bicycle for an inexperienced rider.

A yet still further object of the present invention is to provide such an assembly which is durable in construction, and reliable in operation.

It is still another object of the present invention to provide a stabilizing device of the type aforementioned which is simple and convenient to install.

It is yet another object of the present invention to provide a stabilizing device as in the previous objects which promotes stability in all tilted positions of the bicycle by automatically maintaining contact of both auxiliary wheels with the ground irrespective of the lean angle of the bicycle.

To accomplish the foregoing and other objects of this invention there is provided an improved compensating adjustable training wheel assembly which is attached to a bicycle for assisting the development of balancing skills, particularly when first learning to ride a two-wheel bicycle.

The present invention provides a hinged frame assembly that will support a bicycle rider yet still allow the bicycle to safely lean a restricted amount. The hinged frame assembly forms a rectangle when the bicycle is upright, but forms a parallelogram when the bicycle lean varies from the upright position. Thus the auxiliary wheels lean in coordination with the bicycle's rear wheel and maintain a prescribed distance from the rear bicycle wheel. This allows the rider to experience a more natural movement when learning to ride the bicycle, thereby aiding the transition from bicycling with training wheel apparatuses to bicycling without training wheel apparatuses.

The degree of bicycle lean is controlled by adjusting the length of chain or cable between the lower-inner corner and the upper-outer corner of each frame assembly.

The degree of resistance to the lean of the bicycle necessary to enhance the stability of the bicycle for an inexperienced rider is controlled by a tensioning spring attached to the aforementioned chain or cable. The spring tension is reduced as the skill of the rider increases.

The compensating adjustable training wheel assembly comprises two vertical support members, two horizontal support members, four hinge mechanisms, a chain or cable, a chain or cable length adjuster mechanism, a tension spring, and an auxiliary wheel.

The adjustable training wheel assembly of the present invention preferably has a first vertical support member attached to the rear axle of the bicycle. An auxiliary wheel is attached to a second vertical support member. Each vertical support member is attached at its ends to the end of a horizontal support member by a hinge mechanism, whereby once attached at all four hinges, the two vertical support members and two horizontal support members form a rectangular frame in the upright position. The chain or cable is attached at one end to the inside lower corner of the support frame, and attached at the other end to the outside upper support frame by the chain or cable length adjuster mechanism. One end of a tension spring is attached near the lower end of the chain or cable, and the other end of the tension spring is attached near the upper end of the chain or cable.

The chain or cable work in concert with the tension spring to both dampen and restrict in a coordinated and smooth manner the lean angle of the bicycle.

The degree of bank is controlled by adjusting the chain length. The spring is adjusted to resist the lean forces, but the spring tension is reduced as the skill of the rider increases.

Further objects and advantages of the present invention will become apparent from a consideration of the drawings and ensuing description thereof, selected for purposes of illustration and shown in the accompanying drawing figures.

DESCRIPTION OF THE PREFERRED EMBODIMENTS

Figure 1:
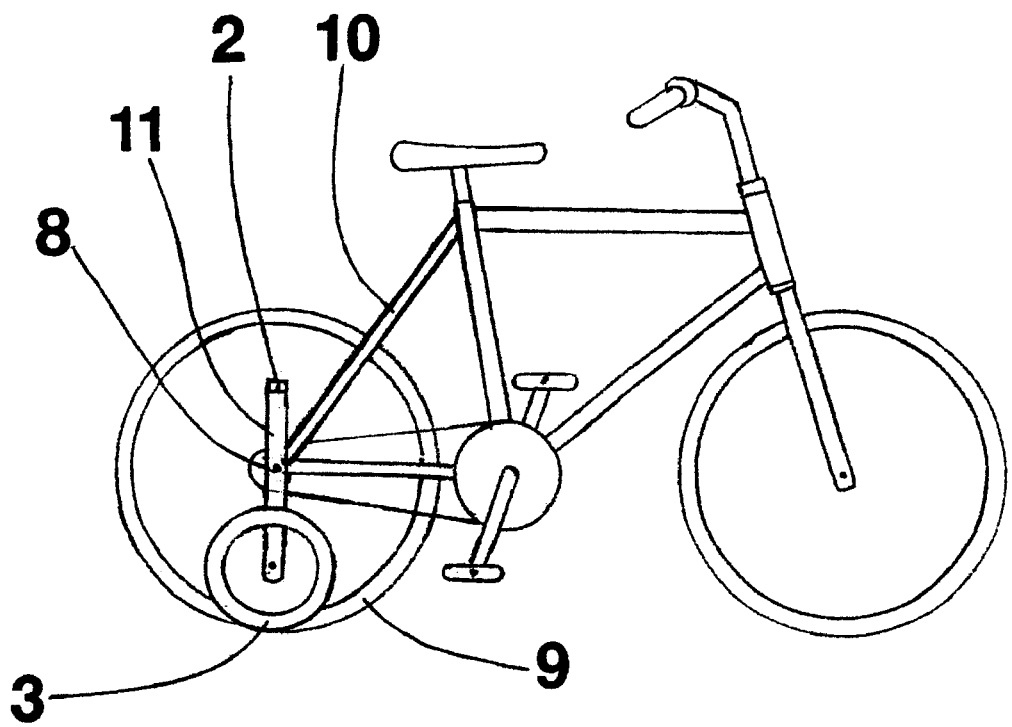
FIG. 1 is a side elevation view of a bicycle in an upright position, showing the stabilizing training wheel assembly in accordance with the present invention mounted thereon.

Referring now to the drawings there is shown a preferred embodiment for the stabilizing training wheel assembly of this invention. The stabilizing training wheel assembly is described in combination with a conventional two-wheel bicycle as shown in FIG. 1, designated by reference numeral 10.

Figure 2:
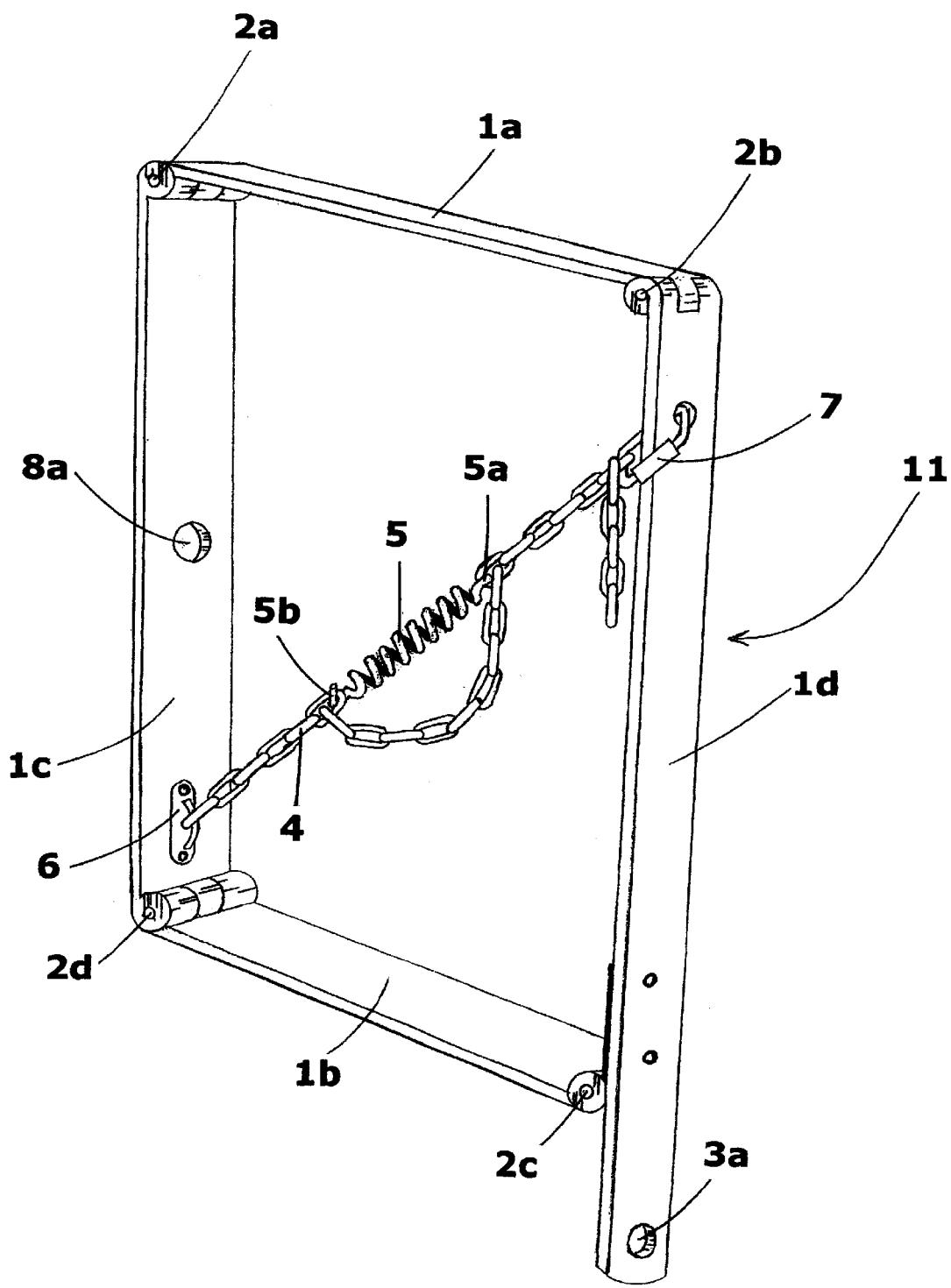
FIG. 2 is a perspective view of one training wheel assembly for mounting on the right side of the bicycle which forms a part of the training wheel apparatus, shown without the auxiliary wheel.
Figure 3:
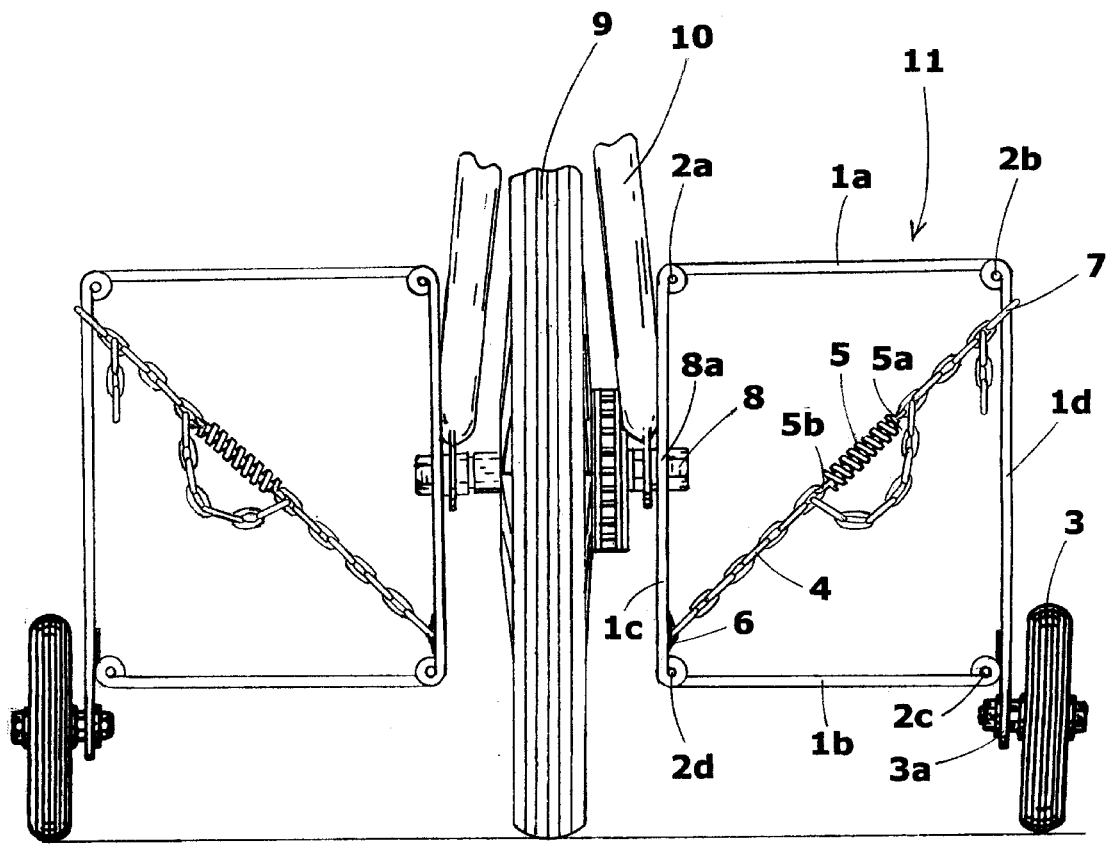
FIG. 3 is an enlarged rear view of the principle portion of the stabilizing device of the present invention attached to both sides of the bicycle shown in FIG. 1.

The training wheel assembly in accordance with the present invention is generally designated by the reference numeral 11. The details of the stabilizing training wheel assembly will be described in connection with FIGS. 2, 3, and 4. In this connection, it is noted that the stabilizing device includes two similar assemblies which are essentially mirror images of each other and which are mounted on respective opposite sides of rear bicycle wheel 9 and attached to rear axle 8. Since the assemblies on both sides are virtually identical and operate in the same manner, the description that follows will refer only to the assembly mounted on the right side of the bicycle. The drawing illustrates the preferred embodiment of the lean limiting device 4 as being a chain.

The training wheel assembly comprises an upper support member 1a, a lower support member 1b, an inner support member 1c, an outer support member 1d, four hinges, 2a, 2b, 2c, 2d, a limiting chain 4, and a spring 5. The upper support member 1a, is joined to the inner support member 1c by hinge 2a, and to the outer support member 1d by hinge 2b; the lower support member 1b is joined to the inner support member 1c by hinge 2d, and to the outer support member by hinge 2c. The lower end of limiting chain 4 is attached near hinge 2d by an attachment member 6. The limiting chain is adjustable by adjuster clip 7 attached near hinge 2b for limiting an increased distance between the corner at lower hinge 2d and the corner at upper hinge 2b. The spring tension is adjustable by moving spring clips 5a and 5b to different locations on limiting chain 4.

The outer support member 1d has a slot 3a on the lower portion provided to facilitate attachment and height adjustment of auxiliary wheel 3.

The entire training wheel assembly 11 is attached to bicycle 10 in the conventional manner in which training wheel assemblies are attached to bicycles. Typically one or more holes or slots 8a are provided to facilitate attachment of the stabilizing training wheel device to the bicycle rear axle 8. While bicycle 10 stands straight up as in FIG. 3, the upper support member 1a extends outward from bicycle 10 90°. The lower support member 1b extends outward from bicycle 10 90° and is both parallel to the upper support member 1a and the ground. The inner support member 1c, and the outer support member 1d both form a 90° angle to the upper support member 1a and the lower support member 1b. Thus the four support members form a rectangle with four 90° corners.

With bicycle 10 in the upright position the tension on spring 5 on the right training wheel assembly 11 would be equal to the tension of the similar spring on the left training wheel assembly. Accordingly limiting chain 4 is not under tension for the section of chain between spring attachment point 5a and spring attachment point 5b when the chain between attachment point 5a and 5b hangs freely. The limiting chain is under tension equal to the tension of spring 5 from attachment point 5a to adjuster clip 7 and attachment point 5b to attachment member 6.

Figure 4:
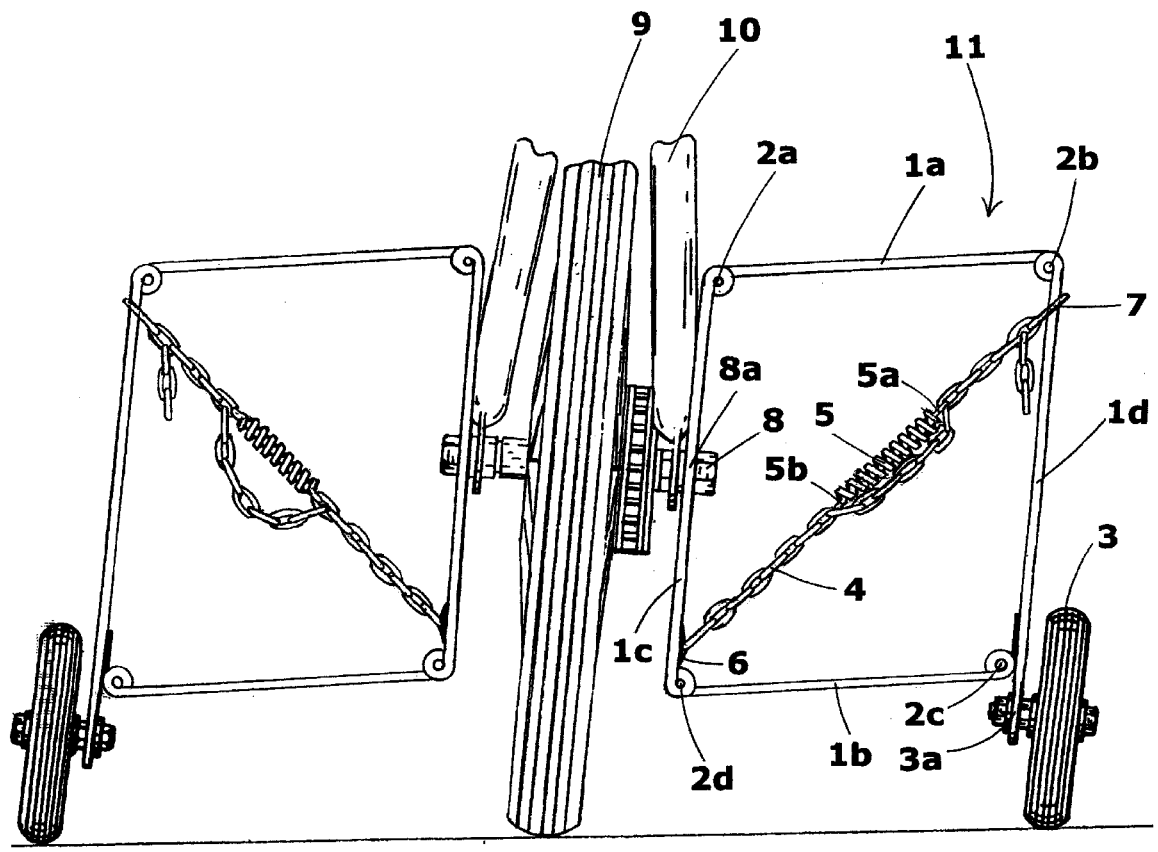
FIG. 4 is similar to FIG. 2, but showing the relative positions of the training wheel assemblies on both sides of the bicycle when the bicycle leans to the right while turning right.

When bicycle 10 leans right into a turn as shown in FIG. 4, the inner support member 1c, and the outer support member 1d, remain parallel with bicycle wheel 9, while the angle formed at the hinge between each support member changes in degrees proportional to the degree of bicycle lean. Thus the rectangle formed by the four support members when bicycle 10 stands straight up becomes a parallelogram when bicycle 10 leans in either direction.

The training wheel assembly 11 on the right side of bicycle body 10 forms a parallelogram with increasing distance between the corners at locations of hinges 2b and 2d when bicycle body 10 is leaned to the right, accordingly the training wheel assembly 11 on the right side of bicycle body 10 forms a parallelogram with decreasing distance between the corners at locations of hinges 2b and 2d when bicycle body 10 is leaned to the left. Thus the tension of spring 5 is increased on the right training wheel assembly 11 when bicycle body 10 is leaned to the right and tension of spring 5 is decreased on the right training wheel assembly 11 when bicycle body 10 is leaned to the left. The left training wheel assembly responds as a mirror image to the right training wheel assembly whenever the bicycle is leaned in either direction.

The position of adjuster clip 7 on limiting chain 4 limits the degree of bicycle lean. when limiting chain 4 length is increased between adjuster clip 7 and attachment member 6 on the right training wheel assembly 11, bicycle body 10 lean is increased to the right; bicycle body 10 lean to the right is decreased when limiting chain length is decreased between adjuster clip 7 and attachment member 6. The limiting chain on the left training wheel assembly limits the degree of lean to the left in like manner to the limiting chain on the right training wheel assembly. The bicycle can not lean either right or left when the limiting chain on the right training wheel assembly, and the limiting chain on the left training wheel assembly does not hang freely between the two spring attachment points on both right and left training wheel assemblies.

The training wheel assembly 11 on the right side of bicycle body 10 forms a parallelogram with decreasing distance between the corners at locations of hinges 2a and 2c when bicycle body 10 is leaned to the right, accordingly the training wheel assembly 11 on the right side of bicycle body 10 forms a parallelogram with increasing distance between the corners at locations of hinges 2a and 2c when bicycle body 10 is leaned to the left.

The tension of spring 5 is adjusted to provide the desired restoring force to bicycle 10 by changing the relative positions of spring attachment point 5a and spring attachment point 5b along limiting chain 4.

Thus the present embodiment of the training wheel assembly 11 maintains a constant relative position of auxiliary wheel 3 to bicycle wheel 9 for all bicycle lean positions, and therefore lean angle of auxiliary wheel 3 leans in concert with bicycle wheel 9, wherein the lean angle of auxiliary wheel 3 matches bicycle wheel 9, and the distance does not change between bicycle wheel 9 and auxiliary wheel 3 at the point of contact with the ground.

What is claimed is:

1. An improved adjustable training wheel apparatus for a bicycle comprising:

a right hinged parallelogram structure; means for attaching said right hinged parallelogram structure adjacent to a rear bicycle tire on the right side of a bicycle body; a right limiting means with a first end attached adjacent to the lower and inner part of said right parallelogram structure, and a second end of said right limiting means attached adjacent to the upper and outer part of said right parallelogram structure, whereby said right limiting means limits said bicycle body from leaning to the right; a right restoring means, having a first end of said right restoring means attached adjacent to said first end of said right limiting means, and a second end of said right restoring means attached adjacent to said second end of said right limiting means, whereby said right restoring means restores said bicycle body to an upright position when said bicycle body leans to the right; a right auxiliary wheel rotatably attached adjacent to the lower and outer part of said right parallelogram structure, whereby said right auxiliary wheel leans in concert with said bicycle body, while a fixed distance is maintained at the points of ground contact between said right auxiliary wheel and said rear bicycle tire;

a left hinged parallelogram structure; means for attaching said left hinged parallelogram structure adjacent to said rear bicycle tire on the left side of said bicycle body; a left limiting means with a first end attached adjacent to the lower and inner part of said left parallelogram structure, and a second end of said left limiting means attached adjacent to the upper and outer part of said left parallelogram structure, whereby said left limiting means limits said bicycle body from leaning to the left; a left restoring means, having a first end of said left restoring means attached adjacent to said first end of said left limiting means, and a second end of said left restoring means attached adjacent to said second end of said left limiting means, whereby said left restoring means restores said bicycle body to an upright position when said bicycle body leans to the left; a left auxiliary wheel rotatably attached adjacent to the lower and outer part of said left parallelogram structure, whereby said left auxiliary wheel leans in concert with said bicycle body, while a fixed distance is maintained at the points of ground contact between said left auxiliary wheel and said rear bicycle tire.

2. The improved adjustable training wheel assembly of claim 1, wherein said right limiting means has means for continuously adjusting the amount of bicycle body lean to the right;

said left limiting means has means for continuously adjusting the amount of bicycle body lean to the left, thereby said right limiting means and said left limiting means allow said bicycle body to lean both right and left to the degree desired.

3. The improved adjustable training wheel assembly of claim 1, wherein said right limiting means has further means for fully restricting said bicycle body from leaning to the right; said left limiting means has further means for fully restricting said bicycle body from leaning to the left, thereby said right limiting means and said left limiting means prevent said bicycle body from leaning either right or left.

4. The improved adjustable training wheel assembly of claim 1, wherein there is further provided means for continuously adjusting said right restoring means, thereby increasing or decreasing the force needed to return said bicycle body to any upright position following a right-leaning action; there is further provided means for continuously adjusting said left restoring means, thereby increasing or decreasing the force needed to return said bicycle body to any upright position following a left-leaning action.

5. The improved adjustable training wheel assembly of claim 1 wherein said right auxiliary wheel leans in coordination with said rear bicycle tire so that a fixed distance is maintained at the points of ground contact between said right auxiliary wheel and said rear bicycle tire, and remain parallel to said rear bicycle tire, thereby providing smooth, stabilized turning;

and said left auxiliary wheel leans in coordination with said rear bicycle tire so that a fixed distance is maintained at the points of ground contact between said left auxiliary wheel and said rear bicycle tire, and remain parallel to said rear bicycle tire, thereby providing smooth, stabilized turning.

6. An improved adjustable training wheel apparatus for a bicycle comprising:

a right upper support member, a right lower support member, a right inner support member, a right outer support member, whereby said right support members are hingedly connected to each other adjacent to their ends, and arranged so as to form a right parallelogram structure; said right parallelogram structure having a connection means for connection adjacent to a rear bicycle tire on the right side of a bicycle body, whereby said right parallelogram structure has substantially perpendicular corners when said bicycle body stands upright, and said right parallelogram structure has corners increasingly displaced from perpendicular as lean angle of said bicycle body increases;

a right limiting means, having a first end of said right limiting means attached adjacent to the lower inside corner formed by said right parallelogram structure, and a second end of said right limiting means attached adjacent to the upper outside corner formed by said right parallelogram structure, whereby said right limiting means limits the degree of bicycle body lean to the right;

a right restoring means, having a first end of said right restoring means attached adjacent to said first end of said right limiting means, and a second end of said right restoring means attached adjacent to said second end of said right limiting means, whereby said right restoring means restores said bicycle body to an upright position when said bicycle body leans to the right;

a right auxiliary wheel rotatably attached adjacent to the lower portion of said right outer support member, whereby said right auxiliary wheel leans in concert with said right outer support member and in proportion to said lean angle of said bicycle body, while a fixed distance is maintained at the points of ground contact between said right auxiliary wheel and said rear bicycle tire;

a left upper support member, a left lower support member, a left inner support member, a left outer support member, whereby said left support members are hingedly connected to each other adjacent to their ends, and arranged so as to form a left parallelogram structure; said left parallelogram structure having a connection means for connection adjacent to said rear bicycle tire on the left side of said bicycle body, whereby said left parallelogram structure has substantially perpendicular corners when said bicycle body stands upright, and said left parallelogram structure has corners increasingly displaced from perpendicular as lean angle of said bicycle body increases;

a left limiting means, having a first end of said left limiting means attached adjacent to the lower inside corner formed by said left parallelogram structure, and a second end of said left limiting means attached adjacent to the upper outside corner formed by said left parallelogram structure, whereby said left limiting means limits the degree of bicycle body lean to the left;

a left restoring means, having a first end of said left restoring means attached adjacent to said first end of said left limiting means, and a second end of said left restoring means attached adjacent to said second end of said left limiting means, whereby said left restoring means restores said bicycle body to an upright position when said bicycle body leans to the left;

a left auxiliary wheel rotatably attached adjacent to the lower portion of said left outer support member, whereby said left auxiliary wheel leans in concert with said left outer support member and in proportion to said lean angle of said bicycle body, while a fixed distance is maintained at the points of ground contact between said left auxiliary wheel and said rear bicycle tire.

7. The improved adjustable training wheel assembly of claim 6 wherein said right upper and lower support members are displaced horizontally, and said right inner and outer support members are displaced vertically when said bicycle body is displaced vertically, enabling said bicycle body to lean into a turn; said left upper and lower support members are displaced horizontally, and said left inner and outer support members are displaced vertically when said bicycle body is displaced vertically, enabling said bicycle body to lean into a turn.

8. An improved adjustable training wheel assembly comprising:

a right upper support member, a right lower support member of equal length to said right upper support member oriented parallel to said right upper support member, a right inner support member connectable to a bicycle at a location adjacent to its rear bicycle tire, a right outer support member of equal length to said right inner support member oriented parallel to said right inner support member, whereby said right upper support member is oriented substantially horizontally, and the first end of said right upper support member is hingedly attached adjacent to the first end of said right inner support member, whereby said right inner support member is oriented substantially vertically, and the second end of said right upper support member is hingedly attached adjacent to the first end of said right outer support member, whereby said right outer support member is oriented substantially vertically, said right lower support member is oriented substantially horizontally, and the first end of said right lower support member is hingedly attached adjacent to the second end of said right inner support member, whereas the second end of said right lower support member is hingedly attached adjacent to the second end of said right outer support member;

a first end of right length adjustable chain or right length adjustable cable connected adjacent to said hinged attachment at lower end of said right inner support member and inner end of said right lower support member, and a second end of said right length adjustable chain or right length adjustable cable connected adjacent to said hinged attachment at upper end of said right outer support member and outer end of said right upper support member, consequently limiting the angular displacement from vertical of said right inner and outer support members, and thereby adjustably limiting the lean angle of said bicycle;

a first end of a right tension spring or right tension elastic means adjustably connected adjacent to said first end of said right chain or said right cable, and a second end of said right tension spring or said right tension elastic means adjustably connected adjacent to said second end of said right chain or said right cable, consequently imparting an adjustable restoring force to said right inner and outer support members when angularly displaced from vertical, thereby imparting an adjustable restoring force to said right upper and lower support members when angularly displaced from horizontal, and restoring said bicycle to an upright position;

a right auxiliary wheel rotatably attached adjacent to the lower portion of said right outer support member, whereby said right auxiliary wheel leans in concert with said right outer support member and in proportion to the lean angle of said bicycle, while a fixed distance is maintained at the points of ground contact between said right auxiliary wheel and said rear bicycle tire;

a left upper support member, a left lower support member of equal length to said left upper support member oriented parallel to said left upper support member, a left inner support member connectable to said bicycle at a location adjacent to said rear bicycle tire, a left outer support member of equal length to said left inner support member oriented parallel to said left inner support member, whereby said left upper support member is oriented substantially horizontally, and the first end of said left upper support member is hingedly attached adjacent to the first end of said left inner support member, whereby said left inner support member is oriented substantially vertically, and the second end of said left upper support member is hingedly attached adjacent to the first end of said left outer support member, whereby said left outer support member is oriented substantially vertically, said left lower support member is oriented substantially horizontally, and the first end of said left lower support member is hingedly attached adjacent to the second end of said left inner support member, whereas the second end of said left lower support member is hingedly attached adjacent to the second end of said left outer support member;

a first end of left length adjustable chain or left length adjustable cable connected adjacent to said hinged attachment at lower end of said left inner support member and inner end of said left lower support member, and a second end of said left length adjustable chain or left length adjustable cable connected adjacent to said hinged attachment at upper end of said left outer support member and outer end of said left upper support member, consequently limiting the angular displacement from vertical of said left inner and outer support members, and thereby adjustably limiting the lean angle of said bicycle;

a first end of a left tension spring or left tension elastic means adjustably connected adjacent to said first end of said left chain or said left cable, and a second end of said left tension spring or said left tension elastic means adjustably connected adjacent to said second end of said left chain or said left cable, consequently imparting an adjustable restoring force to said left inner and outer support members when angularly displaced from vertical, thereby imparting an adjustable restoring force to said left upper and lower support members when angularly displaced from horizontal, and restoring said bicycle to an upright position;

a left auxiliary wheel rotatably attached adjacent to the lower portion of said left outer support member, whereby said left auxiliary wheel leans in concert with said left outer support member and in proportion to the lean angle of said bicycle, while a fixed distance is maintained at the points of ground contact between said left auxiliary wheel and said rear bicycle tire.

* * * * *

UNITED STATES PATENT AND TRADEMARK OFFICE
CERTIFICATE OF CORRECTION

PATENT NO. : 6,318,745 B1  
DATED : November 20, 2001  
INVENTOR(S) : James Virgil Sharp III Page 1 of 1

It is certified that error appears in the above-identified patent and that said Letters Patent is hereby corrected as shown below:

Column 4,
Line 38 change "1cby" to -- 1c by --.

Column 7,
Line 36 change "comer" to -- corner --.
Line 38 change "comer" to -- corner --.
Line 67 change "comers" to -- corners --.

Column 8,
Line 1 change "comers" to -- corners --.
Line 6 change "comer" to -- corner --.

Signed and Sealed this

Twenty-first Day of May, 2002

Attest:

Attesting Officer

JAMES E. ROGAN
Director of the United States Patent and Trademark Office